(12) United States Patent
Chemishkian et al.

(10) Patent No.: US 9,473,875 B2
(45) Date of Patent: Oct. 18, 2016

(54) ASYMMETRIC WIRELESS SYSTEM

(71) Applicants: Sergey Chemishkian, San Jose, CA (US); Ken Gudan, Sunnyvale, CA (US); Jonathan J. Hull, San Carlos, CA (US)

(72) Inventors: Sergey Chemishkian, San Jose, CA (US); Ken Gudan, Sunnyvale, CA (US); Jonathan J. Hull, San Carlos, CA (US)

(73) Assignee: RICOH CO., LTD., Tokyo (JP)

( * ) Notice: Subject to any disclaimer, the term of this patent is extended or adjusted under 35 U.S.C. 154(b) by 0 days.

(21) Appl. No.: 14/199,810

(22) Filed: Mar. 6, 2014

(65) Prior Publication Data

US 2015/0256960 A1    Sep. 10, 2015

(51) Int. Cl.
*H04W 4/00* (2009.01)
*H04W 84/18* (2009.01)

(52) U.S. Cl.
CPC ............. *H04W 4/005* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2006/0103535 | A1* | 5/2006 | Pahlaven | G06K 7/10306 340/572.1 |
| 2007/0248044 | A1* | 10/2007 | Vogety | H04W 72/02 370/329 |
| 2009/0102296 | A1* | 4/2009 | Greene | H01Q 1/248 307/149 |
| 2011/0181399 | A1* | 7/2011 | Pollack | G06K 19/0717 340/10.33 |
| 2011/0231535 | A1* | 9/2011 | Starnes | H04W 4/001 709/223 |
| 2011/0260839 | A1* | 10/2011 | Cook | G06K 19/0708 340/10.4 |
| 2012/0172673 | A1* | 7/2012 | Friedman | H04L 1/0007 600/300 |
| 2013/0170432 | A1* | 7/2013 | O'Brien | H04W 4/06 370/328 |
| 2013/0342355 | A1* | 12/2013 | Lund | H04Q 9/00 340/870.01 |
| 2015/0128733 | A1* | 5/2015 | Taylor | H02J 7/025 73/865.8 |

* cited by examiner

*Primary Examiner* — Brian Roberts
(74) *Attorney, Agent, or Firm* — Blakely, Sokoloff, Taylor & Zafman LLP

(57) ABSTRACT

A method and apparatus is disclosed herein for sensor node and access point communication. In one embodiment, the method comprises embedding, by a sensor node, data from one or more sensor readings in a field of a first message, the field being designated as part of a standardized protocol to send information other than the data sensor readings; determining without the use of a receiver, by the sensor node, whether a wireless communication channel is at a predetermined quality level to send the first message; and broadcasting the first message wirelessly to a component according to the standardized protocol.

11 Claims, 9 Drawing Sheets

ASYMMETRIC WIRELESS SYSTEM

FIELD OF THE INVENTION

Embodiments of the present invention relate to the field of radio-frequency (RF) communication; more particularly, embodiments of the present invention relate to embedding data, such as data from sensor readings, in messages and sending those messages wirelessly to other devices.

BACKGROUND OF THE INVENTION

Wireless sensors often transmit data to servers, directly or indirectly. There are many available wireless transmission solutions in the market to perform the wireless transmission of data from these wireless sensors, including Wi-Fi, Bluetooth, Zigbee, etc. These all share one significant problem: energy consumption. For example, data from a vendor of the lowest power Wi-Fi chip on the market shows that 220 mJ are required to send a single User Datagram Protocol (UDP) packet. This will discharge a standard AA battery very quickly, depending on the duty cycle used. This is a significant problem for current products since the labor cost to replace batteries can quickly exceed the application benefit to the customer.

A cost issue related to the use of some current wireless transmission techniques involves the wireless receiver infrastructure. Many of the alternatives to Wi-Fi such as, for example, Bluetooth or Zigbee, require devices that bridge their protocols to Wi-Fi, in order to reach the internet "cloud". This poses not only a cost issue at installation time but also a maintenance headache for application areas (e.g., sensors in supermarkets) that are extremely cost sensitive and where it's almost impossible to allocate any labor to sensor maintenance.

As discussed above, Wi-Fi has been used for communication with wireless sensors. FIG. 9 illustrates messages (or "frames" in Wi-Fi terminology) exchanged between a wireless sensor, which operates as a Wi-Fi client, and an access point which operates as a Wi-Fi host. Referring to FIG. 9, when a client enters a new Wi-Fi environment, the user starts the system and the client broadcasts a probe request frame (PRF) (901). Access points that receive the PRF respond and the client begins an exchange of messages that sets up a two-way channel with one of the access points. Data is exchanged (902) after a long sequence of messages has been exchanged. The energy to reach this point is 220 mJ with a state-of-the-art Wi-Fi chip (Atheros AP4100).

Probe request frames are typically received only when a connection is established and they contain logical information such as the encryption capabilities of the client that is used to configure aspects of the hardware that support data exchange.

SUMMARY OF THE INVENTION

A method and apparatus is disclosed herein for sensor node and access point communication. In one embodiment, the method comprises embedding, by a sensor node, data from one or more sensor readings in a field of a first message, the field being designated as part of a standardized protocol to send information other than the data sensor readings; determining without the use of a receiver, by the sensor node, whether a wireless communication channel is at a predetermined quality level to send the first message; and broadcasting the first message wirelessly to a component according to the standardized protocol.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
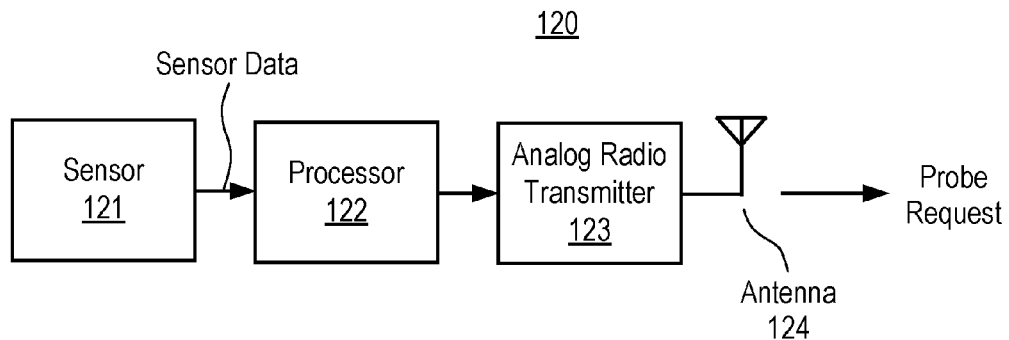
FIG. 1A is a block diagram of an embodiment of a wireless sensor node.

A technique for one-way wireless communication by sensor nodes is disclosed. In one embodiment, data from sensor readings is embedded in probe request messages that Wi-Fi clients typically transmit when they come up on the air. The probe request messages are created by wireless sensor nodes, which send them to access points. The access points process the probe request messages. In one embodiment, this processing occurs at the processor level of the access point rather than in firmware where the processor runs a rudimentary operating system that can intercept probe request frames, extract the data from sensor readings, and send the extracted sensor readings data via a transport layer UDP packet containing the sensor data to a remote destination (e.g., a destination remote with respect to the access point and the wireless sensor node). In one embodiment, the destination is an IP network destination. In such a case, this provides a complete solution for transmitting sensor readings to any destination on the Internet.

Thus, part of the Wi-Fi protocol is repurposed to provide a method for sending data from sensors at any time (not just when they power up) to an existing Wi-Fi infrastructure. This is a huge commercial advantage in comparison to most other techniques for communication with wireless sensors that require a separate infrastructure. In one embodiment, this technique also does not require an acknowledgment from the receiver. This is beneficial in that the hardware may be significantly reduced since the receiver is not included, nor is needed. Also, in one embodiment, Wi-Fi access points are retrofitted with software that converts probe requests containing sensor data into standard TCP/IP messages (e.g., UDP packets) that can be sent to specified destinations.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

A Wi-Fi Communication System with a Sensor Node

One embodiment of a Wi-Fi wireless communication system is described. In the Wi-Fi communication system, communications occur at 2.4 GHz or 5.8 GHz. Note that in alternative embodiments, communications in the wireless communication system occur at other radio frequencies.

In one embodiment, the Wi-Fi communication system is used as part of an intelligent sensor network having one or more sensor nodes (e.g., tags). In one embodiment, the sensor nodes harvest and store energy (e.g., photovoltaic, thermal, vibrational, etc.), collect and process sensor data, and communicate with other devices (e.g., Wi-Fi devices) using a communication standard (e.g., Wi-Fi, Zigbee, Bluetooth, Bluetooth Low Energy), or even proprietary interfaces. In one embodiment in which the sensor nodes communicate via Wi-Fi, the sensor node communicates with another Wi-Fi device by sending standard UDP packets. In another embodiment in which the sensor tags ultimately communicate via Wi-Fi, the sensor node communicates using a proprietary communication protocol (a Wi-Fi bridge is used in this case).

Note that although the sensor nodes are described herein as being low-power sensor nodes that harvest and store energy, the present invention is not limited to the use of such sensor nodes and the techniques described herein are applicable to various sensor node configurations, including, but not limited to those that contain wireless communication chips (e.g., Wi-Fi chips).

In one embodiment, the intelligent sensor network includes Wi-Fi sensor nodes (e.g., tags). FIG. 1A illustrates one embodiment of a sensor node 120 (e.g., sensor tag) that communicates over Wi-Fi. Referring to FIG. 1A, a sensor 121 generates sensor data and sends the sensor data to a processor 122. In response to the sensor data, processor 122 generates one or more probe request messages and sends those probe request messages to analog transmitter 123, which transmits the probe request messages using antenna 124.

Figure 1B:
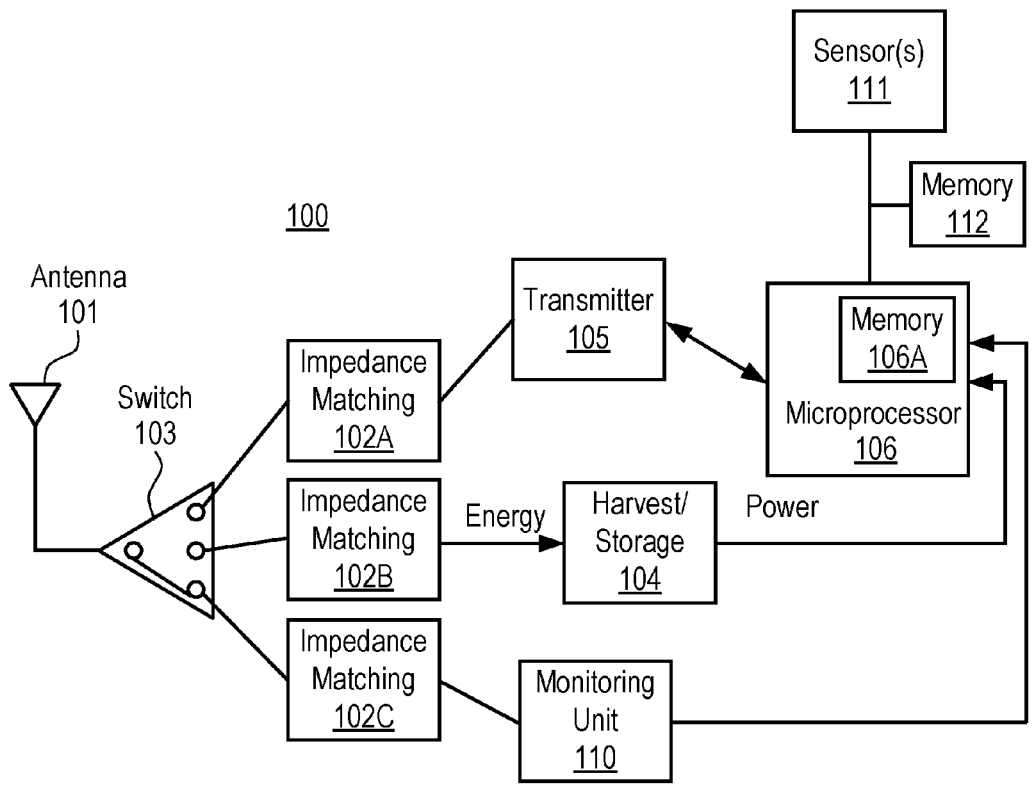
FIG. 1B is a block diagram of another embodiment of a wireless sensor node.

FIG. 1B illustrates another embodiment of a sensor node 100 (e.g., sensor tag) that communicates over Wi-Fi. Referring to FIG. 1B, antenna 101 is coupled to switch 103. The impedance matching circuits 102*a-c* on the outputs of switch 103 may comprise a passive network of components that improves energy transfer from a source impedance to a load impedance. In one embodiment, impedance matching circuits 102*a-c* are LC circuits (i.e., a circuit with an inductor and a capacitor). Switch 103 has a terminal coupled to RF transmitter 105 via impedance matching circuit 102*a*. RF transmitter 105 transmits or broadcasts information such as, for example, data from sensor readings wirelessly using antenna 101. In one embodiment, RF transmitter 105 is an 802.11 Wi-Fi transmitter. RF transmitter 105 is coupled to microprocessor 106 and is responsive to one or more control signals from microprocessor 106 to transmit information.

Another terminal of switch 103 is also coupled to energy harvesting and storage circuitry 104 via impedance matching circuit 102*b*. Energy harvesting and storage circuitry 104 is used to provide power to transmitter 105, microprocessor 106, monitoring unit 110, and sensors 111. In one embodiment, energy harvesting and storage circuitry 104 includes an energy harvesting unit and a storage unit. Energy harvesting and storage circuitry 104 receives energy via antenna 101 through switch 103 and impedance matching circuit 102*b* during energy harvesting and the energy harvested is stored in an energy storage device. The harvesting circuitry may include a diode based rectifier for converting incoming RF energy to a DC voltage. In some embodiments, the diode based rectifier may include Schottky diodes such as those manufactured by Avago Technologies Inc. The harvesting circuits may also include energy management functions based on discrete implementations known to those familiar with the state of the art, or they could use parts such as the MAX17710 of Maxim Integrated™ or the LTC3108 of Linear Technology. The storage unit can be a capacitor, super-capacitor, or any type of rechargeable battery technology such as, for example, an Eneloop battery. Source energy for the charger could also be photovoltaic, thermal, or vibrational. Battery chargers for this type of energy harvesting are well-known to those familiar with the art. The sensor node may comprise a tag that includes tag material. The tag material can be a standard printed circuit board, or a flexible tag printed on film such as modern standard RFID tags.

Sensors 111 include one or more sensors that sense data and provide sensed data to microprocessor 106. In one embodiment, sensors 111 comprise one or more temperature, pressure, humidity, gas composition, image, and position sensors. In one embodiment, sensor node 100 spends most of its time asleep and wakes up to enable sensors 111 to sense data and to transmit that data to locations remote to sensor node 100. There are a number of well-known techniques (e.g., interrupt-based techniques) that can be used to wake up sensor node 100 at different times (e.g., predetermined intervals) to take sensor readings.

In one embodiment, in response to one of sensors 111 sensing data, the sensor signals (e.g., generates an interrupt) to microprocessor 106 to wake-up microprocessor 106 so that the sensed data can be stored on the node (in RAM or ROM internal to microprocessor 106 such as memory 106*a* or external to microprocessor 106 such as memory 112. Memory 106 could also be dual-ported in which case the sensor (111) could write into memory while microprocessor 106 is asleep), so that it can be uploaded to the network (via wireless communication with another RF device that is proximate to it) at a later time. In one embodiment, sensors 111 interrupt microprocessor 106 only when their sense outputs change significantly enough to desire microprocessor 106 to wake up and capture the new condition prior to going back to sleep. Finally, a sensed situation might be significant enough (such as an alarm alert) that one of sensors 111 wakes microprocessor 106 up for a communications event, in addition to a storage event.

Microprocessor 106 acts as a controller for sensor node 100. In one embodiment, microprocessor 106 generates messages to be transmitted wirelessly, via transmitter 105 and antenna 101. In one embodiment, microprocessor 106 creates at least some messages by embedding data from one or more sensor readings from sensors 111 in a field of the message, where the field is designated as part of a standardized protocol (e.g., Wi-Fi) to send information other than the data sensor readings. In one embodiment, the message is a Wi-Fi probe request message and the data sensor readings from sensors are embedded in a field used to specify vendor information. In one embodiment, the field is the Vendor Specific Information as set forth in 802.11.

Microprocessor 106 sends the messages to transmitter 105 for transmission to another wireless component (e.g., an access point, a base station, etc.). In one embodiment, microprocessor 106 sends the messages to transmitter 105 for transmission when notified that the wireless communication channel is at or above a predetermined quality level.

Another terminal of switch 103 is also coupled to monitoring unit 110 via impedance matching circuit 102*c*. Monitoring unit 110 determines whether a wireless communication channel that is going to be used to transmit data from sensor readings made by sensors 111 is at or above the predetermined quality level. In one embodiment, monitoring unit 110 performs this by monitoring incoming radio frequency (RF) signals without the use of a wireless communication receiver. In other words, the determination is made without using a wireless communication receiver. In one embodiment, the determination is made by monitoring incoming radio frequency (RF) signals using an envelope detector (e.g. a logamp). In another embodiment, the determination is made by converting incoming radio frequency (RF) signals to a voltage and comparing the voltage to a threshold voltage level. The voltage conversion may be performed by an RF power detector or a RF rectifier. These and additional techniques are described in greater detail below.

When monitoring unit 110 determines the wireless communication channel is at or above the predetermined quality level (e.g., there is no current wireless communication in progress), monitoring unit 110 notifies microprocessor 106, via a signal or other indication, which causes microprocessor 106 to signal and/or otherwise control transmitter 105 to broadcast the message containing the sensor readings.

Figure 2:
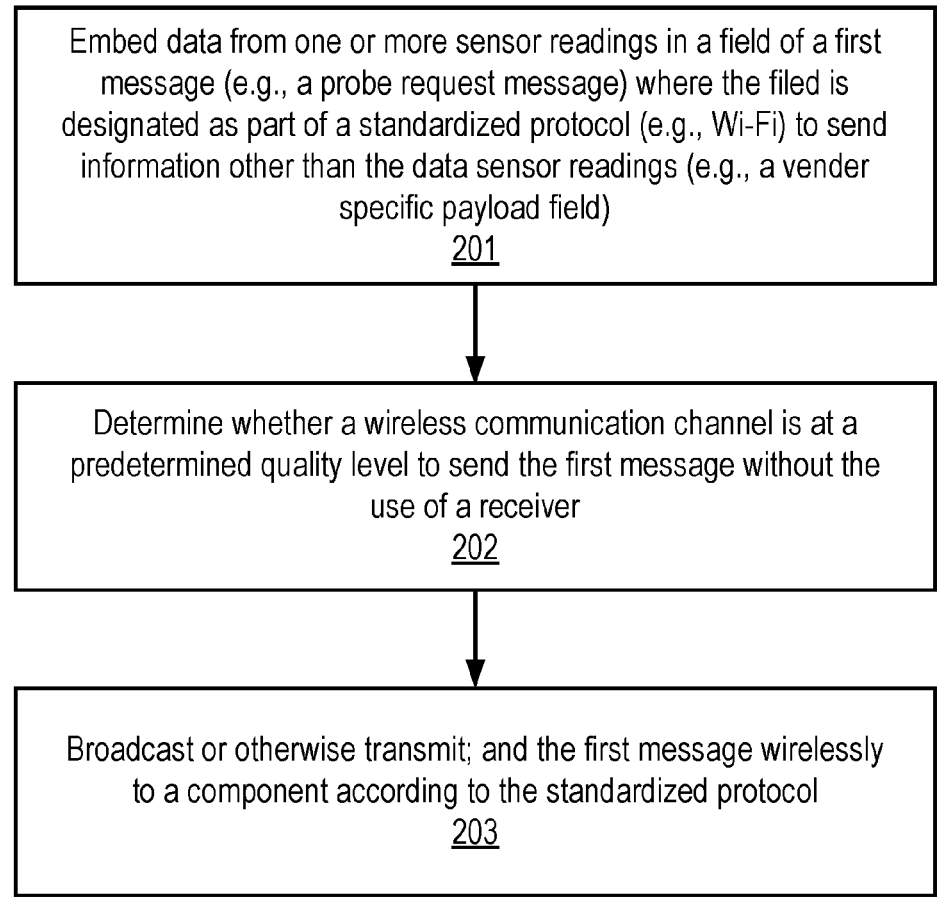
FIG. 2 is a flow diagram of one embodiment of a process for generating and sending messages using a sensor node.

FIG. 2 is a flow diagram of one embodiment of a process for generating and sending messages using a sensor node. The process is performed by processing logic that may comprise hardware (circuitry, dedicated logic, etc.), software (such as is run on a general purpose computer system or a dedicated machine), or a combination of both.

Referring to FIG. 2, the process begins by processing logic embedding data from one or more sensor readings in a field of a first message (e.g., a probe request message) where the field is designated as part of a standardized protocol (e.g., Wi-Fi) (processing block 201). Processing logic determines whether a wireless communication channel is at a predetermined quality level to send the first message without the use of a receiver (processing block 202) and then broadcasts or otherwise transmits the first message wirelessly to a component according to the standardized protocol (processing block 203).

Although not shown, sensor node of FIG. 1A may also include a monitoring unit such as monitoring unit 110 of FIG. 1B.

An Asymmetric Wi-Fi System Arrangement

Figure 3:
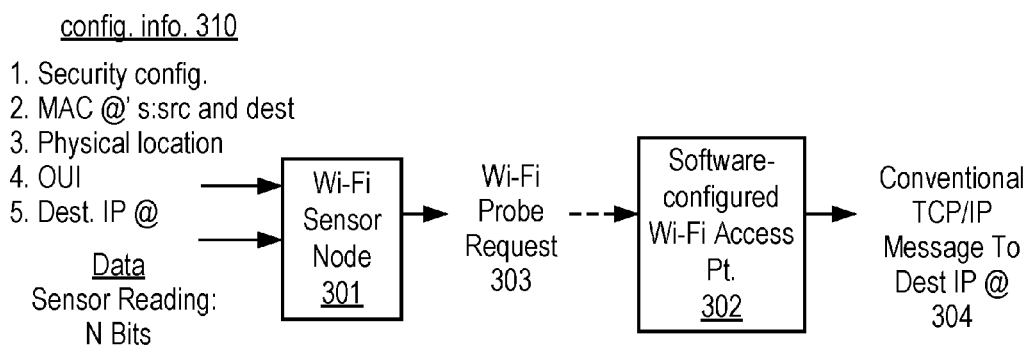
FIG. 3 illustrates one embodiment of an asymmetric Wi-Fi communication system.

FIG. 3 illustrates one embodiment of an asymmetric Wi-Fi communication system. Referring to FIG. 3, Wi-Fi sensor node 301 encapsulates sensor readings in Wi-Fi probe request messages, such as Wi-Fi probe request message 303, and sends the probe request messages to a Wi-Fi access point 302. A probe request is the first message that a Wi-Fi client broadcasts to a Wi-Fi infrastructure when it powers up and looks for an access point with which to communicate. In this case, Wi-Fi sensor node 301 does not have to be capable of two-way communication. Instead of initiating a complex exchange of messages that requires two-way communication and links a host with a client, as is typical in Wi-Fi, the probe request messages are received and processed by access point 302 and any messages from Wi-Fi access point 302 back to sensor node 301 are ignored since Wi-Fi sensor node 301 does not have a communication receiver. This is advantageous in that ignoring messages allows the sensor node to reduce, and potentially minimize, its time "on the air", which reduces its energy needs. In one embodiment, the Wi-Fi sensor node includes a Wi-Fi chip that only sends probe request messages and does not have wireless functionality to receive messages wirelessly.

Access point 302 processes probe request message 303. In one embodiment, access point 302 extracts the embedded sensor readings data from the probe request message and creates another message containing the data from the sensor readings. Access point 302 sends this message to another location remote from access point 302. Access point 302 may send the message via a wired network connection or wirelessly. In one embodiment, access point 302 generates a conventional TCP/IP message 304 and sends the message to an IP address via the Internet.

Figure 4:
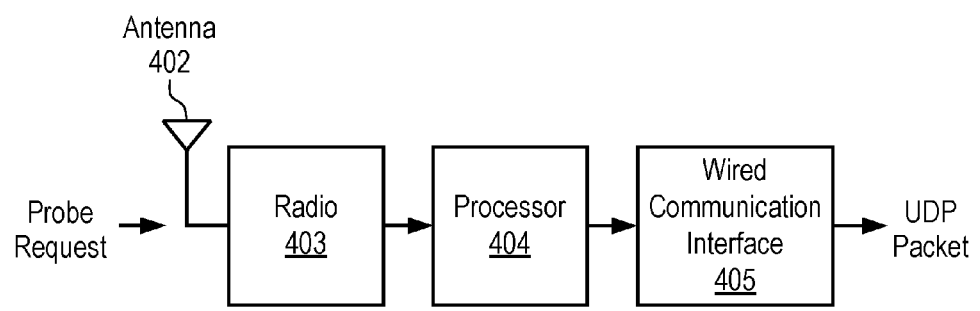
FIG. 4 illustrates one embodiment of an access point.

FIG. 4 illustrates one embodiment of an access point, such as access point 302 of FIG. 3. Referring to FIG. 4, access point 302 comprises a wired communication interface 405, a first antenna 402 that receives the probe request message described herein, a radio 403 coupled to first antenna 402; and a processor 404 coupled to the first antenna 402 and wired communication interface 405, where the processor generates another message (e.g., TCP/IP message, a UDP packet, etc.) with the data from the one or more sensor readings in the probe request message and sends that message to a destination via a wired network (e.g., the Internet) using the wired communication interface. Alternatively, access point 302 transmits the second message (e.g., the TCP/IP message, a UDP packet, etc.) wirelessly using radio 403 or another radio or wireless functionality.

Figure 5:
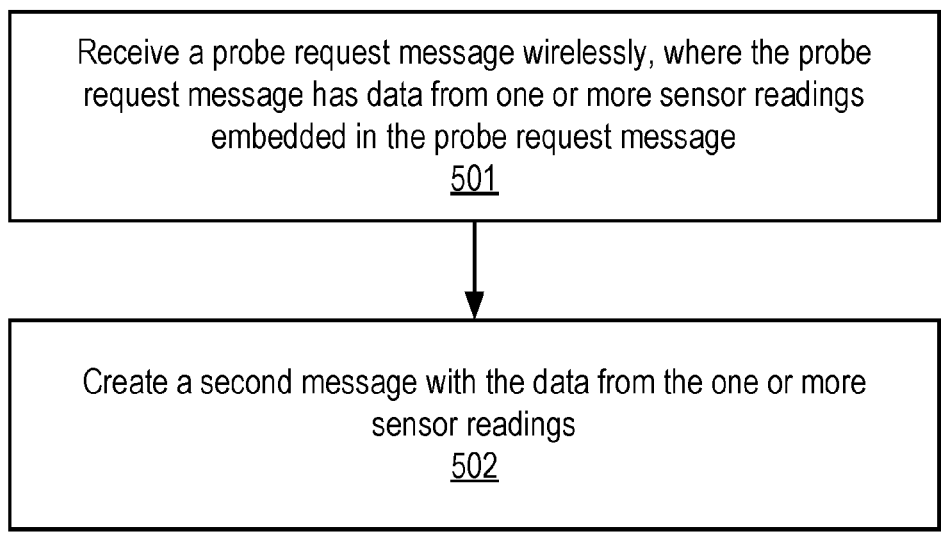
FIG. 5 is a flow diagram of a process for generating and sending a message that includes sensor readings data from a sensor node.

FIG. 5 is a flow diagram of a process for generating and sending a message that includes sensor readings data from a sensor node. The process is performed by processing logic that may comprise hardware (circuitry, dedicated logic, etc.), software (such as is run on a general purpose computer system or a dedicated machine), or a combination of both. In one embodiment, the process is performed by an access point.

Referring to FIG. 5, the process begins with processing logic receiving a probe request message wirelessly, where the probe request message has data from one or more sensor readings embedded in the probe request message (processing block 501). In response to the probe request message, processing logic creates a second message with the data from the one or more sensor readings (processing block 502). In one embodiment, this is a TCP/IP message. The message could include one or more UDP packets. Once the message is created, processing logic sends the message to a destination via a network (e.g., the Internet). The destination may have an address on the Internet or another network. In one embodiment, the processing logic sends the message using a wired communication link. Such a retrofitted Wi-Fi access point can act as a bridge device, specifying a single common source IP address, (e.g. the access point IP address). Alternatively, the access point can act as an IP router, pretending to forward IPv6 frames from phantom IPv6-capable sensors. Unique source IPv6 addresses of sensors can be constructed from unique sensor-specific information. One example would be to construct the phantom address as "link-local IPv6 address" from the sensor Wi-Fi radio's IEEE 802.11 MAC address, following the Modified EUI-64 procedure (see RFC 4291 <http://tools.ietf.org/html/rfc4291>, *IP Version 6 Addressing Architecture*, R. Hinden, S. Deering (February 2006)).

In one embodiment, prior to performing a message exchange, configuration information 310 is supplied to Wi-Fi sensor node 301 when the system is installed. In one embodiment, configuration information 310 comprises security information necessary to authenticate the transmissions, MAC addresses for the source, and potentially the destination. In one embodiment, the physical location of Wi-Fi sensor node 301 is also supplied. This will be useful for some applications in which sensors are placed in fixed locations. In one embodiment, configuration information 310 also includes the OUI, or organizationally unique identifier, that is assigned by the Institute of Electrical and Electronics Engineers, Incorporated (IEEE) and identifies the vendor of Wi-Fi sensor node 301, or at least the Wi-Fi chip within it. In one embodiment, configuration information 310 also includes an address that identifies the recipient of the sensor readings data. This may be a destination IP address on the Internet. As discussed above, the data that is sent from the Wi-Fi sensor node 301 is data from sensor readings.

However, other dynamic data may be included in messages and wirelessly transmitted. This dynamic data may include timestamps, error codes, battery status, etc.

Channel Contention Resolution

As discussed above, the sensor node includes a monitoring unit (e.g., monitoring unit 110 of FIG. 1B) to monitor the wireless channel to avoid congestion caused by other devices transmitting at the same time. Interference on the channel could limit the ability of the access point to receive the message transmitted by the sensor node.

In one embodiment, one solution for channel contention is to broadcast the probe request message N times, where N could be small as one. In one embodiment, the number of transmissions depends on the number of other clients on the channel. In an environment where there are no other Wi-Fi users, every transmission should be correctly received. In any case, by straightforward application of probabilities, out of N messages, where N is less than five, at least one of them will be received, even if the channel is heavily congested. This would provide almost guaranteed reception, but at the cost of a linear increase in energy. This is a significant issue in applications that are severely limited by available energy.

In an alternative embodiment, the monitoring unit uses an envelope detector to avoid channel contention. Instead of a receiver, the envelope detector monitors the incoming RF energy for a lull in energy and causes the sensor node to broadcast the probe request at that instant, during the lull. The lull in energy may be the time the energy is less than a threshold. In essence, the monitoring unit is performing a simplified version of the Wi-Fi Channel Clear Assessment.

There are a number of alternative approaches to determine if the channel is clear that may be used and implemented using the monitoring unit.

Figure 8:
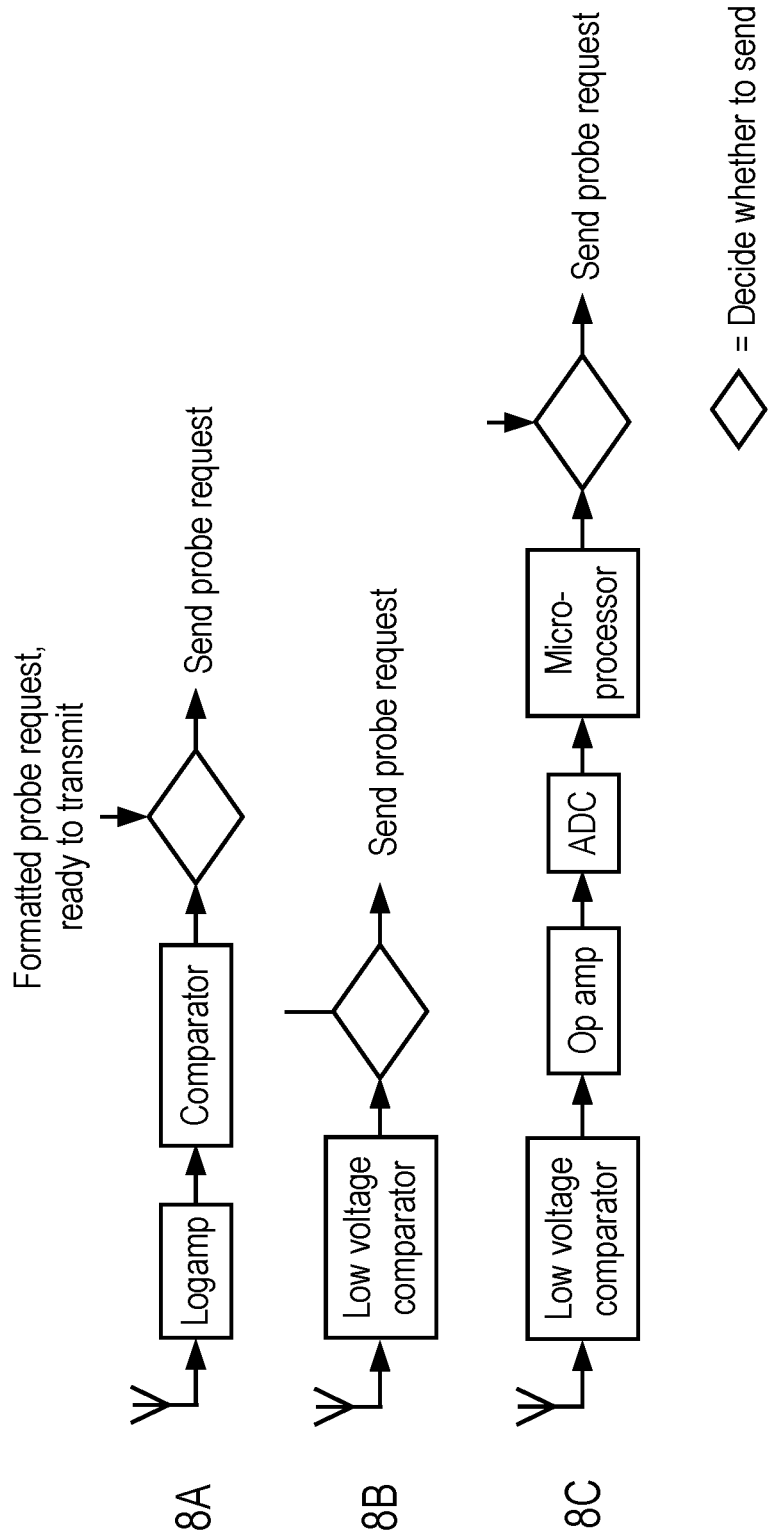
FIGS. 8A-8C illustrate techniques used by monitoring units to determine whether a wireless communication channel is clear enough to send a probe request message.
Figure 9:
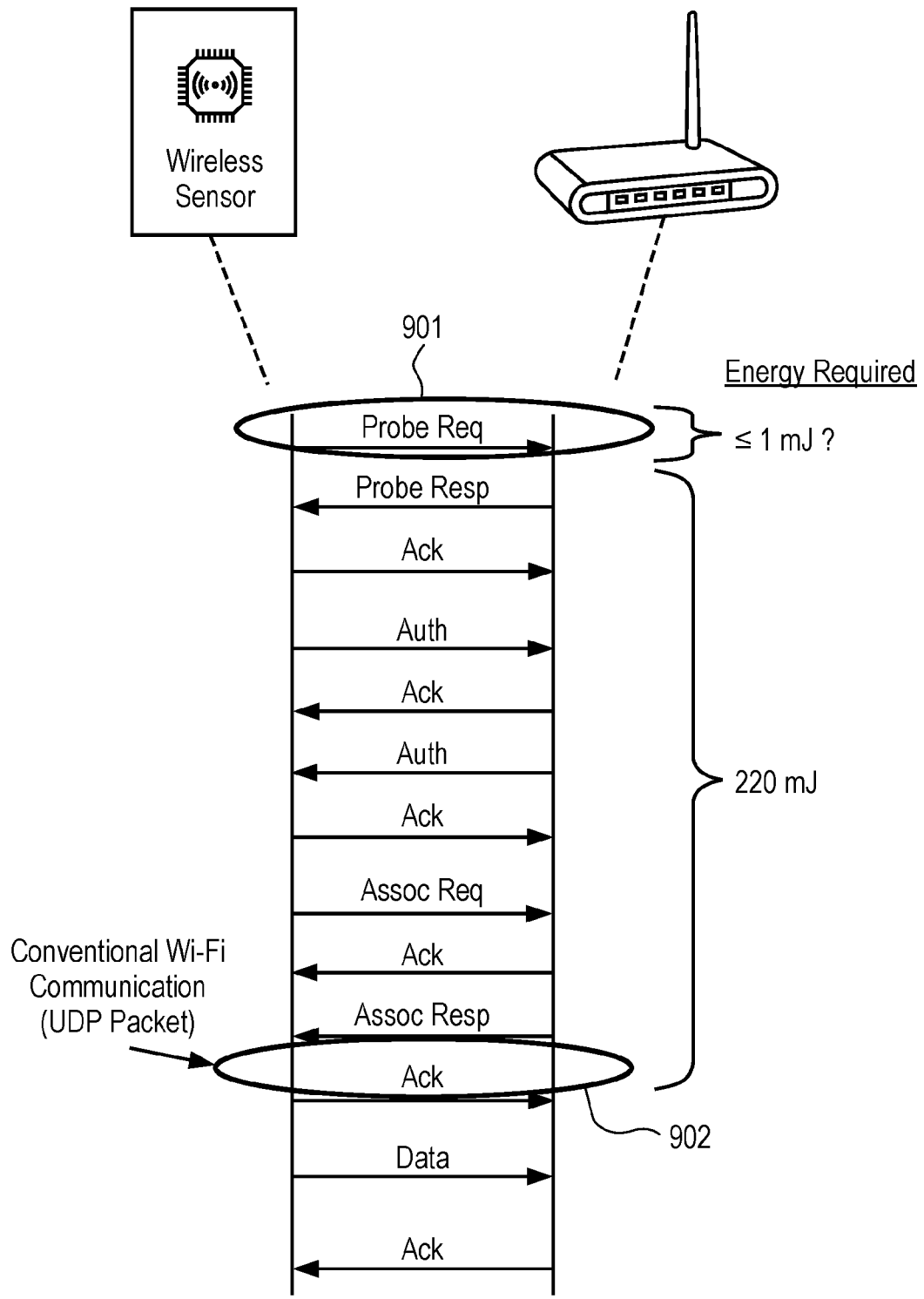
FIG. 9 illustrates prior art message exchange between a wireless sensor and an access point.

In one embodiment, the monitoring unit comprises a logarithmic amplifier detector (also known as a logamp). This is a device that takes RF input power and converts it to a voltage output. A comparator receives the output voltage on one input and a pre-determined fixed input level on the other input. The fixed input level represents the maximum power level indicated as "clear" (such as anything less than −30 dBm), and any time the voltage output from the logarithmic detector is below that fixed input level (such as <1V in this example), the channel is considered clear, and it is safe for the sensor node to transmit the probe request message with the embedded data from sensor readings. This comparison arrangement is shown in FIG. 8A.

In another embodiment, the monitoring unit comprises an RF power detector. An example of this type of device is the LMH2100 of Texas Instruments. In one embodiment, the output of the RF power detector is digitized through an analog-to-digital converter (ADC) and compared by a microprocessor to determine if the incident energy is sufficiently low. The same example numbers as above might apply (for example, if the voltage is <1V, that may be sufficiently low). However, this has the same advantages and disadvantages as using logamp.

In yet another alternative embodiment, the monitoring unit includes an RF power detector and an analog comparison as a single part. An example of this is the LTC5587 of Linear Technology, which gives a single digital output that is used to generate an interrupt when the power is below a certain threshold (pre-determined and programmed during system configuration).

Figure 6:
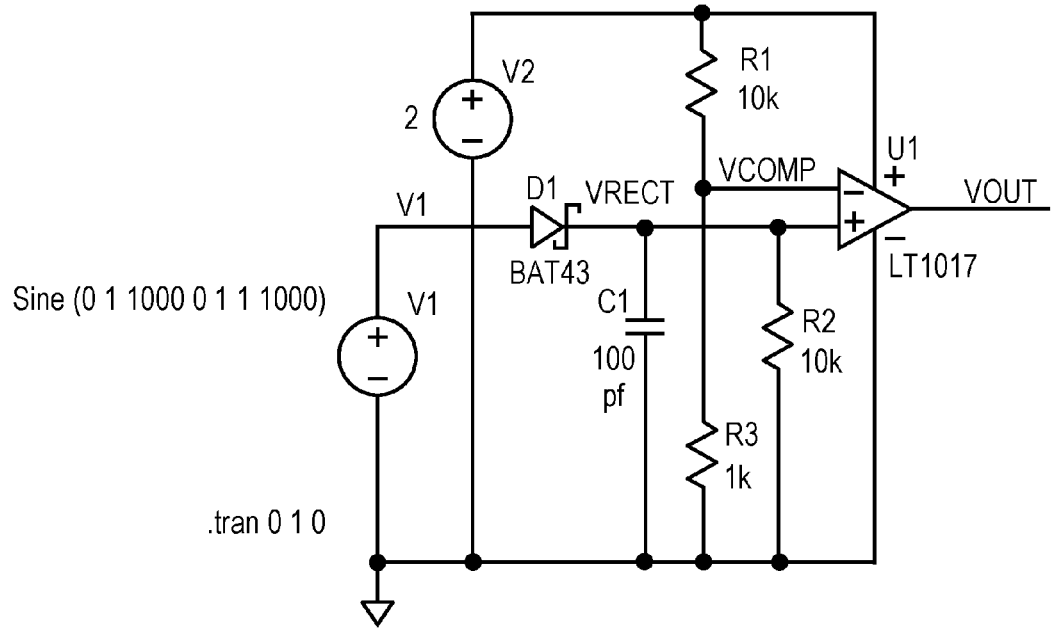
FIG. 6 illustrates a comparator-based low voltage detector.

In still yet another alternative embodiment, the monitoring unit includes an RF rectifier that rectifies the RF input to create a very small voltage. The monitoring unit also includes a low-voltage comparator/detector that compares the voltage to a threshold voltage. FIG. 6 illustrates an example of an RF rectifier. Referring to FIG. 6, V1 represents the RF voltage input that gets half-wave rectified by D1. R1 and R3 are adjusted to set a level below which the voltage (and incident RF) would be determined to be "clear". In one embodiment, the monitoring unit considers it safe to send a packet if the output is <0.3V. A comparison arrangement that uses the output of the RF rectifier is shown in FIG. 8B.

In one more embodiment, the monitoring unit includes a voltage detector that generates an output that has been amplified by an op amp circuit. The signal above, out of D1, could be input to a calibrated voltage multiplier op amp, such as, for example, the AD8293 of Analog Devices. This creates an 80× amplified signal based on a low-voltage swing input. The 80× amplified signal is easy for a microcontroller ADC to digitize, and then a determination can be made as to whether the energy in the RF channel is sufficiently clear to send a package.

Figure 7:
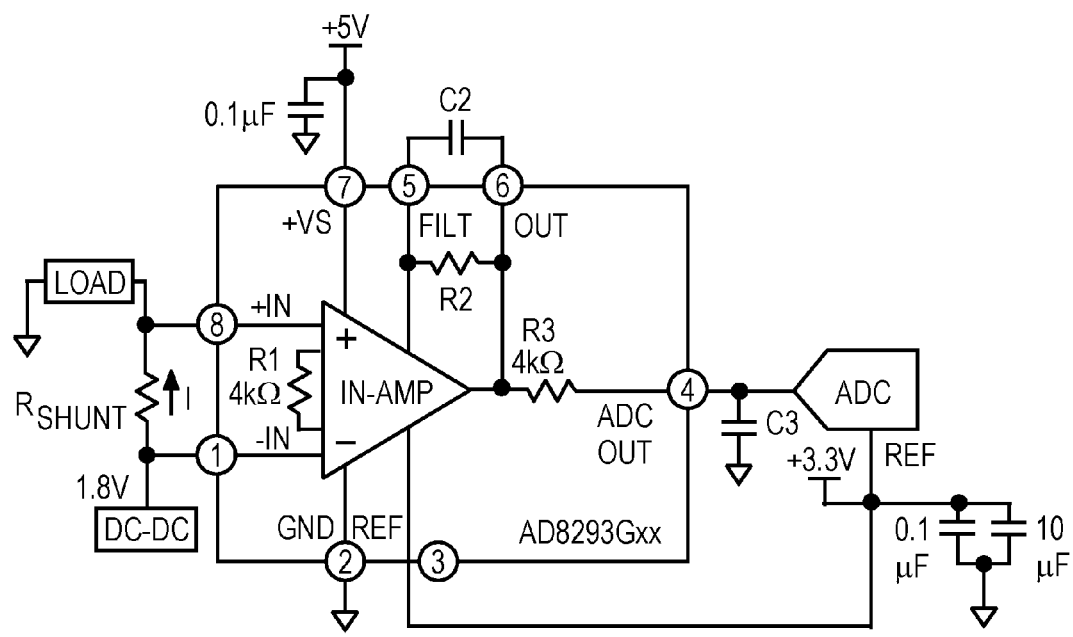
FIG. 7 illustrates an opamp-based low voltage detector.

FIG. 7 illustrates a voltage detector generating an output that is amplified by an op amp. Referring to FIG. 7, power is measured across a voltage drop resistor and amplified into an ADC. Note that a simple extension to provide a low-scale rectified voltage from an antenna and amplify this into an ADC for determination of whether energy is present in the air (channel clear detection) may be used. An example of a comparison arrangement involving these components is shown in FIG. 8C.

In various embodiments of the monitoring unit above, the signal output could be used as a hardware control either for an RF switch input or a digital transmitter "enable" pin, so that the transmitter is switched on (or off) in hardware as soon as the state of the channel is determined. Instead, software could begin looping the transmission with the radio gate turned off. As soon as the channel is determined to be cleared by one of the above methods, the hardware enables the radio automatically to send the packet with the smallest possible latency.

Alternative Embodiments

There are a number of alternative embodiments. The following describes some of the alternative embodiments.

Custom Transmitter Combined with 802.11

In one embodiment, the transmitter directly synthesizes probe request messages. Therefore, the sensor node keeps the data packet, modulation, transmission in the digital realm as long as possible. Often, the modulation is added in the analog realm. But because the sensor node has foreknowledge of almost the entire packet that the sensor node will send (because it doesn't send any other types of packets), the sensor node can pre-construct this packet, and its modulation bits, digitally ahead of time. This creates a transmitter with fewer analog components than usual, which reduces the amount of power consumption used by the sensor node in transmitting the probe request messages.

Figure 10:
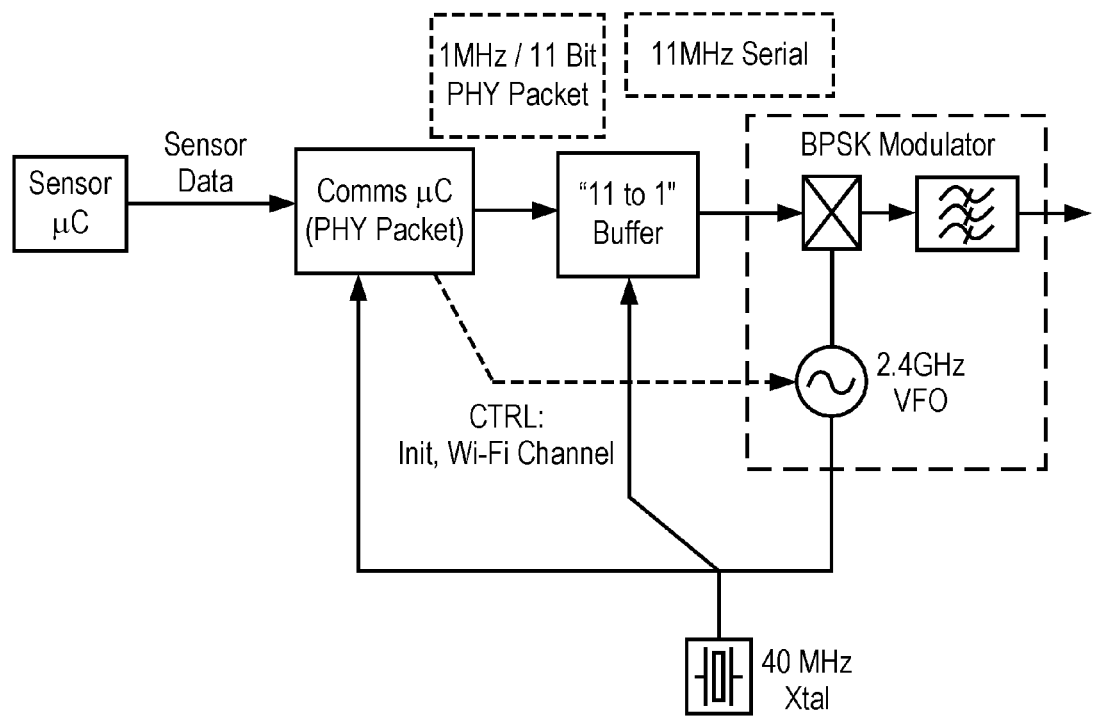
FIG. 10 is a block diagram of one embodiment of a transmitter.

FIG. 10 is one embodiment of a transmitter that includes only a synthesizer, combiner, and filter. Thus, the transmitter has a much smaller, simpler, cheaper analog section, which is identified in the thick dashed box. In one embodiment, the transmitter uses a shift register to implement basic modulation instead of a DSP. In another embodiment, the transmitter uses direct digital synthesis of DBPSK modulation. For more information, see B. R. Jackson, Y. Zheng, C. E. Saavedra, "A CMOS Direct-Digital BPSK Modulator Using an Active Balun and Common-Gate Switches," IEEE International Symposium on Circuits and Systems, May, 27-30, 2007, 2534-2537. In one embodiment, the transmitter uses scrambler and Barker-11 spreader algorithms implemented in hardware (e.g., a shift register with feedback). In one embodiment, the transmitter uses a channel-selective filter required to shape the spectrum of direct digital synthesizer to meet the 802.11b spectral mask requirements (10 MHz or 20 MHz channel).

Fast Startup Time

A significant part of the energy cost to transmit a packet is the startup time, not only the radio transfer time. In a high bandwidth radio interface, the radio transfer time can be 1-2 usec, but startup time can be in the milliseconds, and the energy penalty for this can be much more significant than the time to merely send the data.

Figure 11:
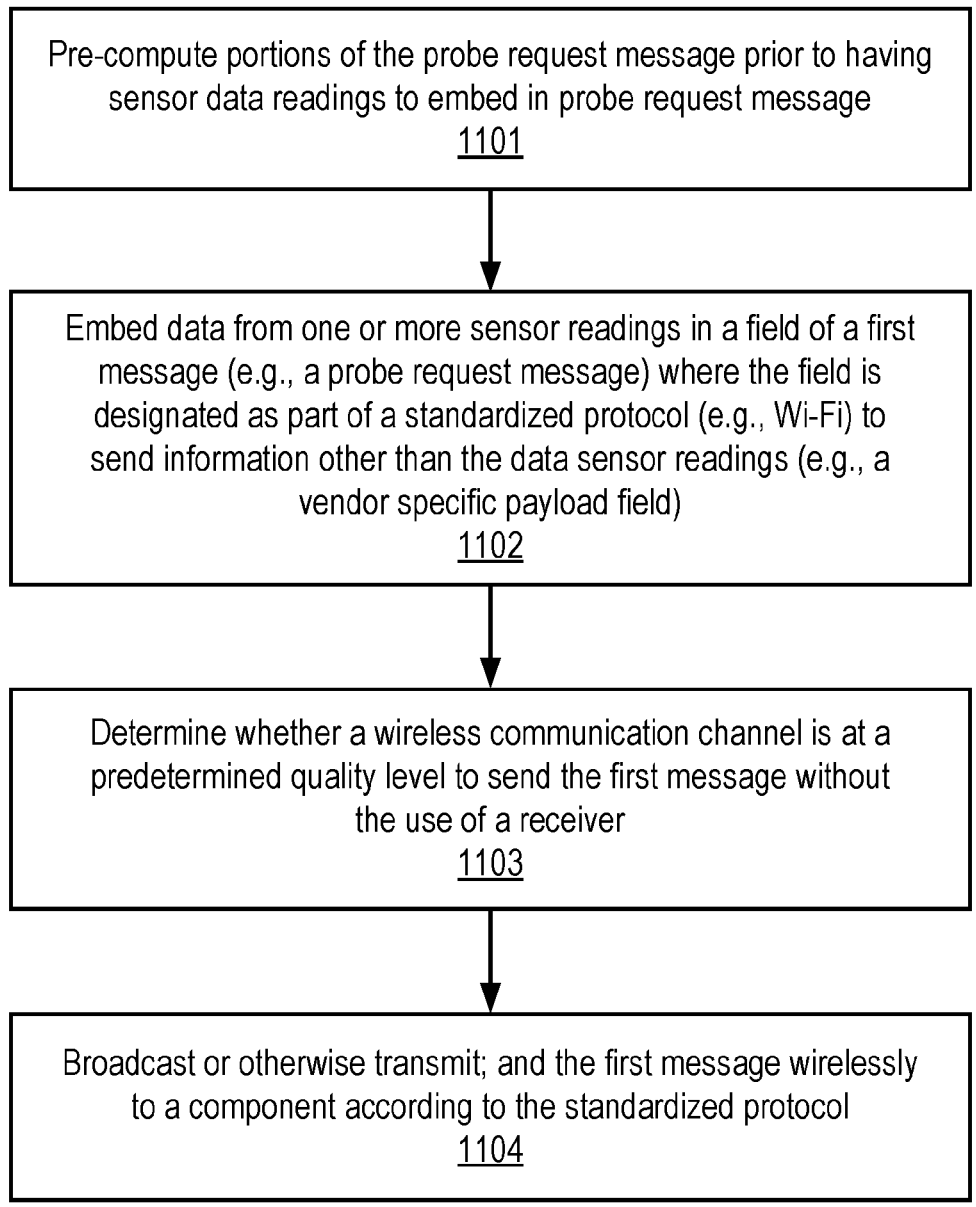
FIG. 11 is a flow diagram of an alternative embodiment of a process for generating and sending messages using a sensor node.

In one embodiment, the sensor node pre-computes or performs operations to compute portions of the probe request frame quicker. In one embodiment, the bit fields in the probe request frame are hardcoded and pre-computed with the exception of the bit fields into which sensor data is embedded. Some bit fields are obtained from lookup tables, such as modulation schemes (encoding) and CRC codes. That is, in one embodiment, the sensor node uses lookup tables instead of computing modulation schemes and/or CRC codes. This can include CRC32 (FCS in 802.11 MAC) and CRC16 (802.11 PHY) checksums. FIG. 11 is a modified version of FIG. 2 in which a portion of the probe request frame is pre-computed (see processing block 1101).

In one embodiment, the pre-computed portion or unchangeable portion of the probe request frame is cached. Then the CRC is computed over the changeable portion of the frame, beginning first with the cached value.

In one embodiment, a portion of the probe request packet content is pre-computed. If the sensor node is measuring temperature from 0-70 C with 0.5 C accuracy, the lookup table (LUT) has less than 150 rows of which to keep track and the temperature is used as an index into the LUT to find a pre-computed version of the packet content, CRC, encoding, and modulation. The same type of pre-computing can occur for other types of sensor data such as pressure or humidity.

In one embodiment, the sensor node is designed to reduce, and potentially minimize, a portion of the startup time. For example, in one embodiment, the sensor node includes a MEMS oscillator instead of a crystal oscillator, which stabilizes much faster. In another embodiment, the sensor node performs operations in parallel so that overall startup time is reduced. For example, sensor nodes starts the PLL stabilization period for the radio transmitter and the sensors read the latest sensor data while the PLL is stabilizing, rather than wait for both events to be performed in series. In yet another embodiment, the sensor node uses a single power supply rail to provide power from a power supply (e.g., battery, energy storage, etc.) to the components of the sensor node. The use of the single power supply rail avoids the use of power rail sequencing (both turning power on and off).

Wi-Fi Collision Avoidance

In one embodiment, standard Wi-Fi protocols are used to ensure that the channel is clear. In this case, Wi-Fi supports control frames that create a temporary silence on the air. This can be used to guarantee a Wi-Fi sensor node transmits a tag in the clear. This is analogous to an emergency vehicle turning on lights and a siren sound, so that the roadway becomes clear, and it can travel quickly and safely to the need.

There are two ways in which to do so. The first involves the Wi-Fi sensor node quieting other Wi-Fi devices, and the second involves the Wi-Fi access points quieting Wi-Fi devices.

In one embodiment, for the first way, the Wi-Fi sensor quiets other Wi-Fi devices through the use of a "jamming pulse". In this case, a sensor node sends a non-information-carrying part of transmission ("a jamming pulse") that disrupts Wi-Fi communications and forces all Wi-Fi devices to back off for a particular time interval (as defined in 802.11 specification). The sensor node then waits for a minimum back-off time interval, as defined in the 802.11 specification, and then begins the information-carrying part of transmission (e.g., transmitting the probe request frame) slightly earlier (1 usec) than a normal Wi-Fi device would do it. In other words, the sensor node uses the Wi-Fi specification back-off time to ensure that it gets "clean air" for transmit. As long as the Wi-Fi packet transmit is in process, other Wi-Fi devices will detect that through their receivers, and will wait for the sensor node to complete transmission of the Wi-Fi packet.

In another embodiment, in the second way, the access point uses the standard Wi-Fi protocol to put all Wi-Fi devices into receive-mode only for a certain amount of time. An access point transmits the 802.11 control frame which forces all Wi-Fi devices into receive mode for interval of up to 100 msec. For more information, see the IEEE 802.11 Specification. In one embodiment, the periodicity of this signal and size of the window depends on the estimated network traffic from the Wi-Fi sensor nodes. The more of Wi-Fi traffic is observed, the more often the access point sends the control frame.

While in receive mode, the channel will be clear for the Wi-Fi sensor node to transmit. In one embodiment, sensor nodes will sense this based on the channel quality detectors described in this disclosure. In one embodiment, in the event that there are several Wi-Fi sensor nodes in the area, their transmit times are randomized based on a unique hardcoded ID on the sensor node, and timing is determined from when the channel was cleared by the access point. In one embodiment, the length of time for forced-receive-mode is a function of the probe-request transmit time multiplied by the anticipated number of sensor nodes in range. Probe request transmit times should range on the order of 1-100 usec, typically, unless the log is very long. Therefore, even if there are 1000 sensor nodes in the environment, the hold-off time need not be greater than 100 msec.

In one embodiment, the access points in an enterprise are synchronized and broadcast a command that puts all Wi-Fi devices in receive mode in a coordinated fashion. In one embodiment, knowledge of the physical arrangement (placement and distance between the access points) is used to determine a group of access points that should send the quiet command simultaneously. For example, if all the access points within 100 meters of a given x-y location broadcast the quiet command at the same time, this would guarantee that the sensor nodes within 50 meters of that x-y location would see no energy and thus they could begin transmitting probe requests.

Wi-Fi Sensor Node Collision Avoidance

If multiple sensor nodes decide to transmit at the same time, a collision occurs. In one embodiment, to avoid this problem and improve the probability that the Wi-Fi air is "clear" when it wants to send its sensor data, the sensor nodes uses a time-based self-retry technique. Using such a technique ensures that Wi-Fi sensor nodes do not interfere with each other when transmitting.

More specifically, in one embodiment, to minimize chance of collision, each sensor node adds a random delay T and waits. If the clear channel assessment (CCA) circuit reports "busy" before T expires, the sensor node returns to sleep (e.g., reenters the sleep mode); otherwise, the sensor node begins transmission. In one embodiment, the maximum T is less than 802.11-defined wait time (sensor nodes shall get on the air before any other Wi-Fi device), and the minimum T depends on the CCA circuit time constant (i.e., the time lag of the CCA circuit—how long does it require to detect if there is energy in the air or not). In one embodiment, the time T is greater than the time constant of the CCA circuit, and less than the minimum 802.11 wait-time (thus, the Wi-Fi sensor node claims the air space for transmission before other Wi-Fi devices join in).

The time lag of the CCA circuit should be very short. For example, logamp RF energy detectorresponse times are faster than 100 nsec, and Wi-Fi standard backoff times are a minimum of 10 usec. Therefore, in one embodiment, Wi-Fi sensor nodes are randomized, based on hardcoded ID bits, to back-off between 100 nsec and 10 usec, thereby increasing the probability of "clean air" when they want to transmit. In one embodiment, the number of randomization slots is adjusted by a sensor node based on Wi-Fi backlog, i.e. how many times the sensor failed to start transmission.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    embedding, by a sensor node, data from one or more sensor readings in a field of a first message, the field being designated as part of a standardized protocol to send information other than the data sensor readings;
    determining without the use of a receiver, by the sensor node, whether a wireless communication channel is at a predetermined quality level to send the first message; and
    broadcasting the first message wirelessly to a component according to the standardized protocol.

2. The method defined in claim 1 wherein the message comprises a probe request message.

3. The method defined in claim 1 wherein the standardized protocol is Wi-Fi and the component is a Wi-Fi access point.

4. The method defined in claim 1 wherein determining whether a wireless communication channel is at the predetermined quality level comprises monitoring incoming radio frequency (RF) signals using an envelope detector.

5. The method defined in claim 4 wherein the envelope detector comprises a logamp.

6. The method defined in claim 1 further comprising:
creating, in response to receiving the first message wirelessly, a second message with the data from the one or more sensor readings; and
sending the second message to a destination via a wired network.

7. The method defined in claim 6 wherein the second message is a TCP/IP message in the form of a UDP packet and the wired network is the Internet.

8. A sensor node for use in a sensor network, the sensor comprising:
one or more sensors for sensing and logging data;
an antenna;
a transmitter coupled to the antenna to transmit information wirelessly; and
a controller coupled to an energy harvesting and storage circuitry, the one or more sensors, and the transmitter, the controller, using energy previously harvested and stored by the energy harvesting and storage circuitry, to:
embed data from one or more sensor readings from the one or more sensors in a field of a first message, the field being designated as part of a standardized protocol to send information other than the data sensor readings,
determine whether a wireless communication channel is at a predetermined quality level to send the first message, and
signal the transmitter to broadcast the first message wirelessly to a component according to the standardized protocol.

9. The sensor node defined in claim 8 wherein the message comprises a probe request message, the standardized protocol is Wi-Fi, and the component is a Wi-Fi access point.

10. The sensor node defined in claim 8 wherein the sensor node further comprises the energy harvesting and storage circuitry further comprising:
an energy harvesting unit operable to convert incident energy to direct current (DC); and
an energy storage unit operable to store recovered DC power.

11. The sensor node defined in claim 8 further comprising a monitoring unit to determine whether a wireless communication channel is at the predetermined quality level by monitoring incoming radio frequency (RF) signals, the monitoring unit to indicate to the controller when the wireless communication channel is at the predetermined quality level to cause the controller to signal the transmitter to broadcast the first message.

* * * * *